United States Patent
Spurk et al.

(10) Patent No.: US 9,095,816 B2
(45) Date of Patent: Aug. 4, 2015

(54) CATALYST FOR REMOVING NITROGEN OXIDES FROM THE EXHAUST GAS OF DIESEL ENGINES

(75) Inventors: Paul Spurk, Weiterstadt (DE); Nicola Soeger, Nidderau (DE); Elena Mueller, Pfungstadt (DE); Stephan Malmberg, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 49 days.

(21) Appl. No.: 13/877,075

(22) PCT Filed: Nov. 14, 2011

(86) PCT No.: PCT/EP2011/070005
§ 371 (c)(1),
(2), (4) Date: Mar. 29, 2013

(87) PCT Pub. No.: WO2012/065933
PCT Pub. Date: May 24, 2012

(65) Prior Publication Data
US 2013/0189172 A1    Jul. 25, 2013

(30) Foreign Application Priority Data
Nov. 16, 2010    (EP) .................................... 10014644

(51) Int. Cl.
*B01J 21/00*    (2006.01)
*B01J 23/00*    (2006.01)
(Continued)

(52) U.S. Cl.
CPC ........ *B01D 53/9422* (2013.01); *B01D 53/9418* (2013.01); *B01J 23/002* (2013.01);
(Continued)

(58) Field of Classification Search
USPC .................. 502/303, 100, 300, 302, 304, 305
See application file for complete search history.

(56) References Cited

U.S. PATENT DOCUMENTS

| 5,756,057 A | 5/1998 | Tsuchitani et al. |
| 6,089,015 A | 7/2000 | Strehlau et al. |

(Continued)

FOREIGN PATENT DOCUMENTS

| DE | 198 06 062 A1 | 8/1999 |
| DE | 101 04 160 A1 | 8/2002 |

(Continued)

OTHER PUBLICATIONS

International Search Report for PCT/EP2011/070005 mailed Feb. 20, 2012 (in English).

(Continued)

*Primary Examiner* — James McDonough
(74) *Attorney, Agent, or Firm* — Smith, Gambrell & Russell, LLP (57) ABSTRACT

The invention relates to a catalyst for removal of nitrogen oxides from the exhaust gas of diesel engines, and to a process for reducing the level of nitrogen oxides in the exhaust gas of diesel engines. The catalyst consists of a support body of length L and of a catalytically active coating which in turn may be formed from one or more material zones. The material zones comprise selectively catalytically reductive (SCR-active) mixed oxide consisting of cerium oxide, zirconium oxide, rare earth sesquioxide and niobium oxide and optionally tungsten oxide. In addition, the material zones comprise at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof. Noble metal may optionally also be present in the catalyst.

19 Claims, 2 Drawing Sheets

(51) Int. Cl.
| | |
|---|---|
| *B01J 25/00* | (2006.01) |
| *B01J 29/00* | (2006.01) |
| *B01J 23/10* | (2006.01) |
| *B01D 53/94* | (2006.01) |
| *B01J 23/20* | (2006.01) |
| *B01J 23/30* | (2006.01) |
| *B01J 23/63* | (2006.01) |
| *B01J 23/648* | (2006.01) |
| *B01J 23/652* | (2006.01) |
| *B01J 23/68* | (2006.01) |
| *B01J 35/00* | (2006.01) |
| *B01J 35/04* | (2006.01) |
| *B01J 37/02* | (2006.01) |
| *F01N 3/20* | (2006.01) |

(52) U.S. Cl.
CPC ............... *B01J 23/20* (2013.01); *B01J 23/30* (2013.01); *B01J 23/63* (2013.01); *B01J 23/6484* (2013.01); *B01J 23/6527* (2013.01); *B01J 23/682* (2013.01); *B01J 23/687* (2013.01); *B01J 35/0006* (2013.01); *B01J 35/04* (2013.01); *B01J 37/0244* (2013.01); *B01J 37/0248* (2013.01); *B01D 2255/202* (2013.01); *B01D 2255/204* (2013.01); *B01D 2255/207* (2013.01); *B01D 2255/2061* (2013.01); *B01D 2255/2065* (2013.01); *B01D 2255/20715* (2013.01); *B01D 2255/20776* (2013.01); *B01D 2255/407* (2013.01); *B01D 2255/9022* (2013.01); *B01D 2255/9032* (2013.01); *B01D 2255/91* (2013.01); *B01J 2523/00* (2013.01); *F01N 3/2066* (2013.01); *F01N 2510/0684* (2013.01); *Y02T 10/24* (2013.01)

(56) References Cited

U.S. PATENT DOCUMENTS

| | | | |
|---|---|---|---|
| 6,468,941 | B1 * | 10/2002 | Bortun et al. ................. 502/300 |
| 6,725,647 | B2 * | 4/2004 | Pfeifer et al. .................... 60/274 |
| 6,956,008 | B2 * | 10/2005 | Takeshima et al. ........... 502/326 |
| 7,160,832 | B2 | 1/2007 | Crocker et al. |
| 7,431,895 | B2 * | 10/2008 | Pfeifer et al. ................. 422/177 |
| 2007/0089403 | A1 * | 4/2007 | Pfeifer et al. .................... 60/286 |
| 2010/0037597 | A1 | 2/2010 | Eckhoff et al. |

FOREIGN PATENT DOCUMENTS

| | | |
|---|---|---|
| DE | 103 08 287 A1 | 9/2004 |
| EP | 0 666 099 A1 | 8/1995 |
| EP | 0 879 633 A2 | 11/1998 |
| EP | 1 203 611 A1 | 5/2002 |
| EP | 1 364 699 A1 | 11/2003 |
| WO | 2005/085137 A1 | 9/2005 |
| WO | 2008/077602 A1 | 7/2008 |

OTHER PUBLICATIONS

Naoto Miyoshi, et al., "Development of New Concept Three-Way Catalyst for Automotive Lean-Burn Engines", SAE Technical, International Congress and Eposition, Detroit, Michigan, Feb. 27-Mar. 1995, pp. 121-130 (SAE 950809).

* cited by examiner

CATALYST FOR REMOVING NITROGEN OXIDES FROM THE EXHAUST GAS OF DIESEL ENGINES

The invention relates to a catalyst for removal of nitrogen oxides from the exhaust gas of diesel engines, and to a process for reducing the level of nitrogen oxides in the exhaust gas of diesel engines.

The exhaust gas of diesel engines comprises soot particles (PM) and nitrogen oxides ($NO_x$), as well as the carbon monoxide (CO) and hydrocarbon (HC) pollutant gases resulting from incomplete combustion of the fuel. In addition, the exhaust gas of diesel engines contains up to 15% by volume of oxygen. It is known that the oxidizable CO and HC pollutant gases can be converted to harmless carbon dioxide ($CO_2$) by passing them over a suitable oxidation catalyst, and particulates can be removed by passing the exhaust gas through a suitable soot particle filter.

The reductive removal of nitrogen oxides ("denoxing") is much more difficult due to the high oxygen content of the diesel exhaust gases. A known denoxing process is called the SCR process (SCR=Selective Catalytic Reduction), i.e. the selective catalytic reduction of the nitrogen oxides with the reducing agent ammonia over a catalyst suitable therefor, the SCR catalyst. Ammonia can be added to the exhaust gas stream as such or in the form of a precursor compound decomposable to ammonia under ambient conditions, "ambient conditions" being understood to mean the environment of the compound decomposable to ammonia in the exhaust gas stream upstream of the SCR catalyst. The performance of the SCR process requires a source for provision of the reducing agent, an injection device for metered addition of the reducing agent to the exhaust gas as required, and an SCR catalyst arranged in the flow path of the exhaust gas. The totality of reducing agent source, SCR catalyst and injection device arranged on the inflow side with respect to the SCR catalyst is also referred to as SCR system.

In addition, nitrogen oxide storage catalysts can be used for denoxing of diesel exhaust gases. The mode of operation thereof is described in detail in the SAE document SAE 950809. The cleaning action of the nitrogen oxide storage catalysts is based on storage, in a lean operating phase of the engine, of the nitrogen oxides by the storage material of the storage catalyst, predominantly in the form of nitrates. In a subsequent rich operating phase of the engine, the nitrates formed beforehand are decomposed and the nitrogen oxides released again are reacted with the reducing exhaust gas components over the storage catalyst to give nitrogen, carbon dioxide and water.

Combination processes for denoxing of internal combustion engine exhaust gases, in which SCR catalysts and nitrogen oxide storage catalysts are used, have also already been described. In these combination systems, the nitrogen oxide storage catalyst is generally connected upstream of the SCR catalyst on the inflow side, and serves to produce ammonia during a rich operating phase, which is then stored in the downstream SCR catalyst. Nitrogen oxides which break through the nitrogen oxide storage catalyst due to inadequate dynamic storage capacity during the subsequent lean operating phase can be reduced to nitrogen with the aid of this stored ammonia on the downstream SCR catalyst. Corresponding systems have been described, for example, in DE 10104160, DE 10308287 and WO 2008/0077602.

Inverse system configurations with a nitrogen oxide storage catalyst arranged on the outflow side with respect to the SCR catalyst have also already been proposed, for example in EP 0 879 633 and U.S. Pat. No. 7,160,832.

In addition, the prior art discloses catalysts which both have nitrogen oxide-storing action and are capable of catalyzing the selective catalytic reduction of nitrogen with ammonia. EP 1 203 611 discloses an exhaust gas cleaning device for selective catalytic reduction of nitrogen oxides under lean exhaust gas conditions, this comprising at least one catalyst with a catalytically active component for selective catalytic reduction (SCR component) and additionally at least one nitrogen oxide storage component ($NO_x$ component). The catalyst is operated by the urea SCR process, i.e. the reducing agent used for nitrogen oxides is ammonia, which is produced from urea added to the lean exhaust gas.

DE 198 06 062 also discloses a reduction catalyst for reducing the level of pollutants in diesel engine exhaust gases, which comprises, in its active composition, an $NO_x$ storage material as well as an SCR catalyst material based on the catalytically active oxides $TiO_2$, $WO_3$, $MoO_3$ and $V_2O_5$. The $NO_x$ storage material comprises, as an active component, at least one high-surface area inorganic oxide which is preferably selected from the group of $Al_2O_3$, $SiO_2$, $ZrO_2$, zeolites and sheet silicates.

EP 0 666 099 describes a process for removing nitrogen oxides from oxidizing exhaust gases, which are passed over a specific catalyst which stores the nitrogen oxides, and then a reducing agent is periodically added to the exhaust gas, which reduces the nitrogen oxides adsorbed in the catalyst to nitrogen. The catalyst comprises inorganic oxides and catalytically active components. The catalytically active components comprise firstly noble metals selected from platinum, palladium, rhodium and ruthenium, and secondly at least one alkali metal and/or alkaline earth metal. In addition, the catalyst may comprise heavy metals selected from manganese, copper, cobalt, molybdenum, tungsten and vanadium or compounds thereof.

Mixed oxides which, as well as cerium, zirconium and rare earth metal, also contain niobium are known from U.S. Pat. No. 6,468,941 and are used therein as oxygen-storing materials. In addition, WO2005/085137 also discloses mixed oxides comprising cerium, zirconium and niobium.

At present, the SCR process for denoxing of diesel exhaust gases is considered to be the most promising cleaning process for nitrogen oxides for applications in passenger vehicles and for standard use in utility vehicles. Especially in the case of passenger vehicles, however, it should be noted that the temperatures of the exhaust gas to be cleaned which occur in the NEDC ("New European Driving Cycle") are shifting ever further into the colder range. Since dosage of urea as a source for the ammonia reducing agent is possible in a controlled manner only at temperatures from 180° C. without accepting unwanted deposits of urea and conversion products in the exhaust gas system, the result of this evolution in the exhaust gas temperatures is that the SCR process can no longer be employed effectively in the "urban part" (ECE) of the NEDC. Nitrogen oxide breakthroughs during the ECE and hence exceedance of the prescribed $NO_x$ limits in the overall NEDC driving cycle are the consequence.

It is an object of the present invention to provide a catalyst and an exhaust gas cleaning process which, compared to the systems from the prior art, exhibits improved $NO_x$ conversion performance over the entire NEDC-relevant temperature range, but especially at relatively low temperatures, for example between 100 and 230° C., in particular between 100 and 200° C.

The object is achieved by a catalyst for removing nitrogen oxides from the exhaust gas of diesel engines, consisting of a support body of length L and a catalytically active coating composed of one or more material zones comprising a) a catalytically active mixed oxide consisting of cerium oxide, zirconium oxide, rare earth sesquioxide and niobium oxide and optionally tungsten oxide; and
b) at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof, and by a process for removing nitrogen oxides from the exhaust gas of diesel engines, wherein the exhaust gas to be cleaned has an air ratio λ greater than 1 and is passed over an inventive catalyst.

The effect of the particular composition of the inventive catalyst is that the nitrogen oxides present in the exhaust gas to be cleaned can be stored in the catalyst in the form of nitrates at temperatures less than or equal to 200° C. As a result, nitrogen oxide breakthroughs in the catalyst are very substantially avoided in temperature ranges in which dosage of urea is not yet possible in a viable manner. If the exhaust gas temperatures exceed 200° C., such that dosage of the urea reducing agent proportionate to the demand is possible in a controlled manner, the nitrogen oxides stored in the catalyst at colder temperatures are released again and reduced selectively with ammonia to nitrogen. As a result of the synergistic interaction of the components present in the catalyst, the NOx conversion is thus much enhanced over the entire NEDC-relevant temperature range, but especially at lower temperatures, for example between 100 and 230° C., in particular between 100 and 200° C., compared to prior art systems.

Preferably, the catalytically active mixed oxide present in the inventive catalyst is composed of 15 to 50% by weight of $CeO_2$, 3 to 25% by weight of $Nb_2O_5$, 3 to 10% by weight of rare earth sesquioxide $RE_2O_3$, and zirconium oxide $ZrO_2$, based on the total amount of this catalytically active mixed oxide.

If the catalytically active mixed oxide contains tungsten oxide, it is preferably composed of 15 to 50% by weight of $CeO_2$, 3 to 25% by weight of $Nb_2O_5$, 3 to 10% by weight of rare earth sesquioxide $RE_2O_3$, 3 to 20% by weight of $WO_3$, and zirconium oxide $ZrO_2$, based on the total amount of this catalytically active mixed oxide.

The preferred rare earth sesquioxides $RE_2O_3$ used are especially lanthanum oxide $La_2O_3$, yttrium oxide $Y_2O_3$ and neodymium oxide $Nd_2O_2$.

Such a material features excellent catalytic activity in the SCR reaction. Unlike the otherwise customary SCR catalysts based on zeolite, this material has only a low ammonia storage capacity, but this is very stable over the typical operating and aging states which occur in the exhaust gas system. This means that the catalyst, in the case of highly dynamic dosage of urea, which is frequently required in automotive application, reacts very flexibly to the different reducing agent supply, and the reducing agent supplied reacts very rapidly with the nitrogen oxides.

This improvement in the light-off and conversion characteristics in the inventive catalyst is synergistically promoted by the presence of a nitrogen oxide storage material selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof.

Preferably, the inventive catalyst contains 0.1 to 25% by weight of a compound selected from the group consisting of barium oxide, barium hydroxide, barium carbonate, strontium oxide, strontium hydroxide, strontium carbonate, praseodymium oxide, lanthanum oxide, alkali metal oxide, alkali metal hydroxide, alkali metal carbonate and mixtures thereof, based on the total amount of the catalyst.

More preferably, the inventive catalyst contains 0.2 to 10% by weight of a compound selected from the group consisting of barium oxide, barium hydroxide, barium carbonate, strontium oxide, strontium hydroxide, strontium carbonate, praseodymium oxide, lanthanum oxide, alkali metal oxide, alkali metal hydroxide, alkali metal carbonate and mixtures thereof, based on the total amount of the catalyst.

Most preferably, the inventive catalyst contains 1 to 5% by weight of barium oxide, based on the total amount of the catalyst.

In another configuration of the present invention, the catalyst contains preferably 0.1 to 50% by weight of a magnesium oxide or of a mixed magnesium/aluminum oxide in addition to the compound selected from the group consisting of barium oxide, barium hydroxide, barium carbonate, strontium oxide, strontium hydroxide, strontium carbonate, praseodymium oxide, lanthanum oxide, alkali metal oxide, alkali metal hydroxide and alkali metal carbonate and based on the total amount of the catalyst.

More preferably, the catalyst of this configuration of the invention contains 10 to 40% by weight, most preferably 15% to 25% by weight, of magnesium oxide or mixed magnesium/aluminum oxide in addition to the compound selected from the group consisting of barium oxide, barium hydroxide, barium carbonate, strontium oxide, strontium hydroxide, strontium carbonate, praseodymium oxide, lanthanum oxide, alkali metal oxide, alkali metal hydroxide and alkali metal carbonate and based on the total amount of the catalyst.

At relatively cold operating points where urea dosage is not yet possible without accepting unwanted deposits of urea and conversion products in the exhaust gas system, the nitrogen oxides are stored in the nitrogen oxide storage material to form nitrates. If the exhaust gas temperature on the inflow side of the inventive catalyst exceeds a predetermined value, the dosage of urea can be effected in such a way that the nitrogen oxides stored in the nitrogen oxide storage material are reduced from urea to nitrogen with ammonia within a very short time. The availability of the small but fast-acting ammonia store in the inventive mixed oxide enables the conduction of this process in a particularly advantageous manner.

In preferred embodiments of the inventive catalyst, the catalytically active coating contains, in addition to the catalytically active mixed oxide, a further oxide or oxides, especially a further cerium oxide and/or mixed cerium/zirconium oxide. Cerium oxides or mixed cerium/zirconium oxides, especially when they are cerium-rich, i.e. have cerium oxide contents greater than 40% by weight, more preferably greater than 60% by weight, based in each case on the total weight of the mixed cerium/zirconium oxide, have a promoting effect on the nitrogen oxide storage capacity in the low-temperature range to 200° C. In order to ensure particularly intimate contact with other nitrogen oxide-storing materials in the inventive catalyst, this additional cerium oxide and/or mixed cerium/zirconium oxide is used as a support oxide for the compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures. This distinctly improves the ability of the inventive catalyst, in the low-temperature range to 200° C., to dynamically store nitrogen oxides in the form of nitrates and to release them again rapidly at higher temperatures.

The oxides mentioned, especially cerium oxides and mixed cerium/zirconium oxides, are preferably doped or stabilized with further metals. Examples of the oxides mentioned are especially lanthanum-doped mixed aluminum/cerium oxides, mixed cerium/zirconium/praseodymium oxides, mixed cerium/zirconium/lanthanum oxides, cerium oxide and mixed cerium/zirconium oxide.

Both the rate of the SCR reaction and the effectiveness of the storage of nitrogen oxides in the form of nitrates depends on the $NO/NO_2$ ratio in the exhaust gas to be cleaned. For example, the SCR reaction proceeds most rapidly when the $NO/NO_2$ ratio is around 1. The storage of the nitrogen oxides in the form of nitrates proceeds the most rapidly in the case of some storing materials, for example barium oxide, when a maximum amount of the NO present in the exhaust gas has been oxidized beforehand to $NO_2$. In both reactions, the $NO/NO_2$ ratio can be adjusted in situ over the catalyst surface in a step preceding the actual target reaction. For this purpose, preferred embodiments of the inventive catalyst comprise, in the catalytically active coating, one or more noble metals selected from the group consisting of platinum, palladium, rhodium, iridium, ruthenium, gold, silver and mixtures and/or alloys thereof. Particular preference is given to the platinum group metals platinum, palladium, rhodium, ruthenium and mixtures and/or alloys thereof. The type and amount of the noble metals for use in the catalytic coating should be selected such that the resulting catalyst does not have any significant ammonia oxidation capacity in the application-relevant temperature range. The preferable selection of noble metals and the concentration thereof is also determined by the overall composition of the catalyst and becomes apparent to the person skilled in the art from the customary optimization tests.

The components present in the catalyst may be present in a homogeneous coating on the support body. In applications in which the inventive catalyst is exposed to moderate exhaust gas temperatures until the end of its intended use, good denoxing results can be achieved with such embodiments.

Preference is given, however, to embodiments in which the catalytically active coating consists of two material zones, the first material zone comprising the catalytically active mixed oxide consisting of cerium oxide, zirconium oxide, rare earth sesquioxide and niobium oxide and optionally tungsten oxide, while the compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof is present in the second material zone.

A feature of particular significance is the spatial separation of different components present in the catalyst into two material zones from which the catalytically active coating is composed when the selected embodiment comprises noble metal. In this case, particular preference is given to embodiments in which the first material zone comprises the catalytically active mixed oxide consisting of cerium oxide, zirconium oxide, rare earth sesquioxide and niobium oxide and optionally tungsten oxide, while the noble metal selected from the group consisting of platinum, palladium, rhodium, iridium, ruthenium, gold, silver and mixtures and/or alloys thereof is present in the second material zone.

The spatial separation of the noble metal and of the mixed oxide which catalyzes the SCR reaction and is composed of cerium oxide, zirconium oxide, rare earth sesquioxide and niobium oxide and optionally tungsten oxide achieves the effect that the inventive catalyst, even at relatively high exhaust gas temperatures, exhibits excellent selectivity for nitrogen in the SCR reaction. As a result, under suitable operating conditions, little $NO_x$ is formed from the overoxidation of excess ammonia.

Embodiments of the inventive catalyst in which two different material zones are present may in principle be configured as layer catalysts or as zone catalysts. For production of such catalysts, two coating suspensions of different compositions are used to provide a ceramic or metal flow honeycomb preferably used as the support body with the appropriate catalytically active coating components which form the material zones.

Figure 1A:
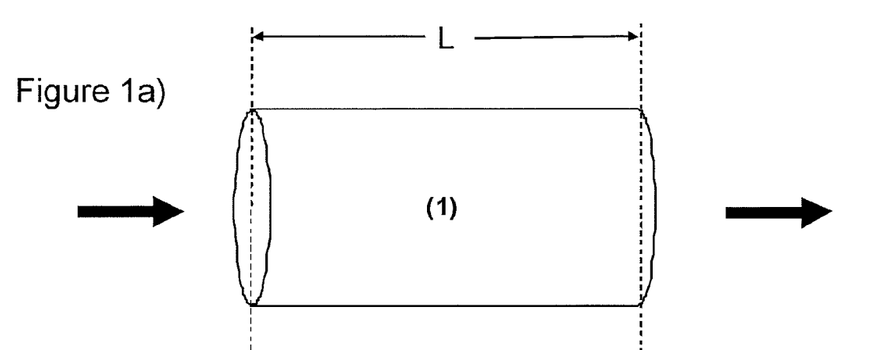
FIG. 1: Schematic diagram of an inventive layer catalyst comprising a flow honeycomb (1) and the catalytically active coating (3), formed from two superposed material zones (3a and 3b).
Figure 1B:
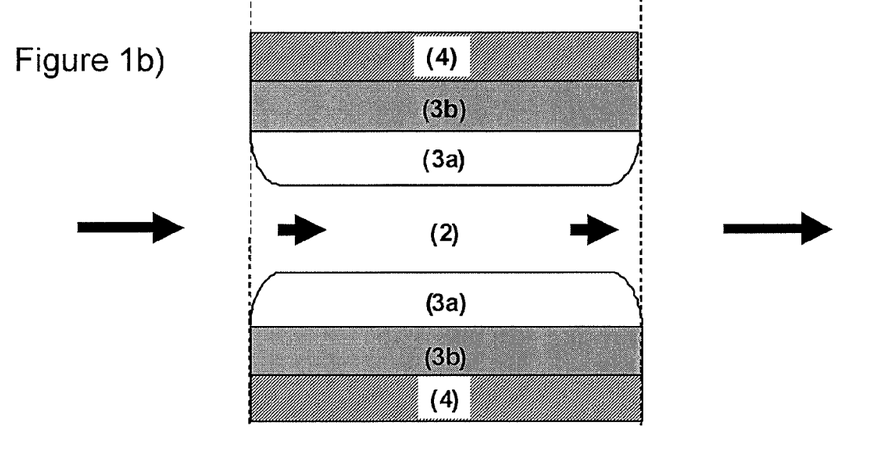
FIG. 1b) shows a section from the coated flow honeycomb comprise an individual flow channel (2) with the coating applied to the gas-tight walls (4) thereof.

For production of a layer catalyst, a catalytically active layer is first applied over the entire length of the support body with a coating suspension of corresponding composition by one of the conventional dipping, sucking and/or pumping processes. After drying and optional calcination of this first layer, the operation is repeated with a second coating suspension of different composition, such that a second catalytically active coating component (material zone) forms on the first catalytically active coating component. In the finished layer catalyst, one material zone has thus been applied directly to the support body and covers the entire length L thereof. The other material zone has been applied on top of this and covers that material zone completely on the exhaust gas side. FIG. 1 shows the schematic structure of such a layer catalyst, FIG. 1*a*) showing an overview of the coated flow honeycomb (1): FIG. 1*b* shows a schematic of an individual flow channel (2) as a section from the layer catalyst. The two superposed material zones (3*a* and 3*b*) are arranged therein on the gastight walls (4) which bound the flow channel, and these form the composition of the catalytically active coating of preferred embodiments of the inventive catalyst. The arrows indicate the flow direction of the exhaust gas to be cleaned.

Figure 2A:
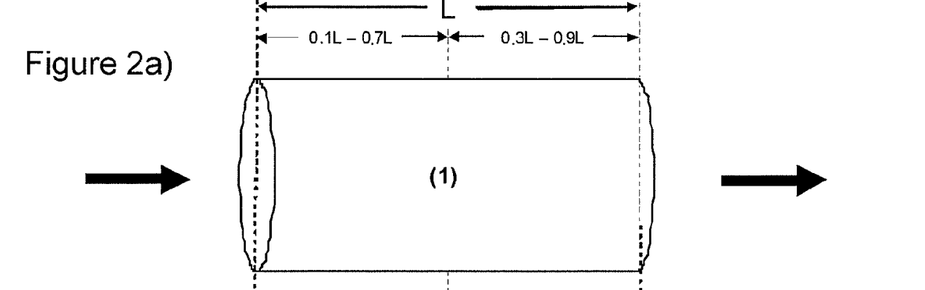
FIG. 2: Schematic diagram of an inventive zone catalyst comprising a flow honeycomb (1) and the catalytically active coating (3), formed from two superposed material zones (3a and 3b).
Figure 2B:
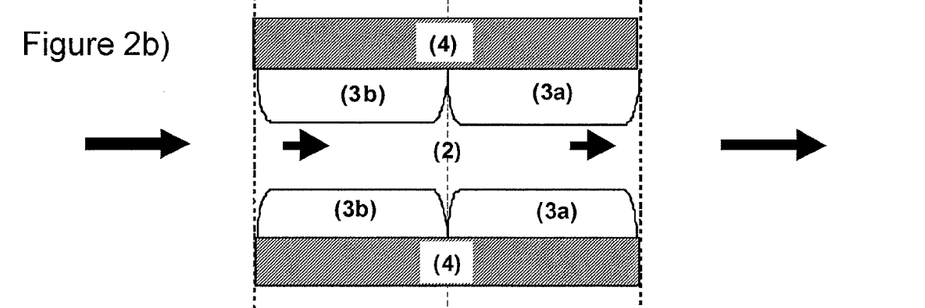
FIGS. 2b) to 2d) show an individual flow channel (2) as a section from the zone catalyst and the material zones arranged therein on the gas-tight walls (4) which bound the flow channel in various embodiments.
Figure 2C:
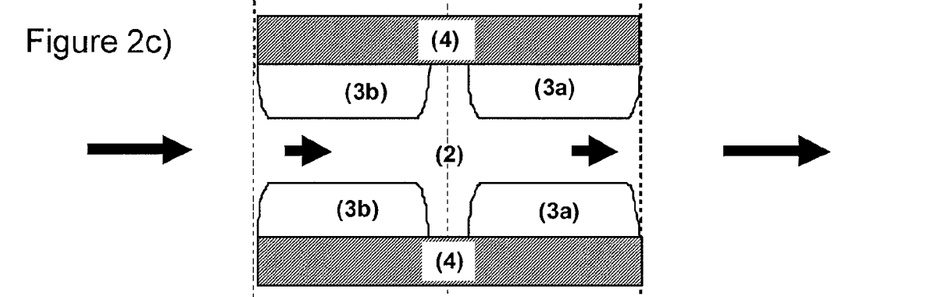
Figure 2D:
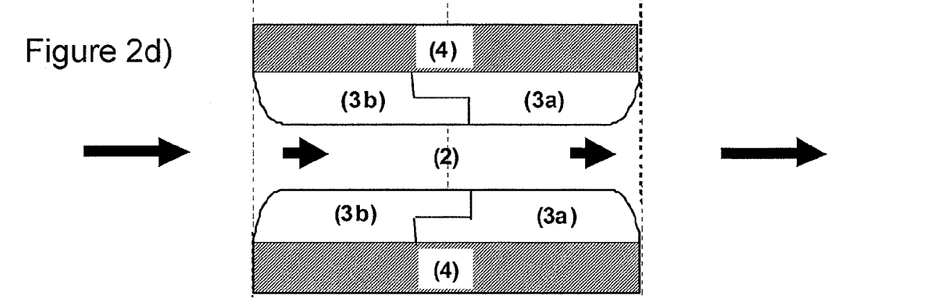

In a zone catalyst, the two material zones are arranged successively on the support body in flow direction of the exhaust gas and form an inflow-side and an outflow-side zone. For production of the first zone, a coating suspension of suitable composition is introduced into the ceramic or metal flow honeycomb preferably utilized as the support body by one of the conventional dipping, sucking and/or pumping processes, for example from the later inflow side of the catalyst. The application ends, however, after a defined distance in the support body which is smaller than the length of the support body L. After drying and optional calcination of the resulting portion, the second zone is produced by introducing the second coating suspension proceeding from the other side, for example the later outflow side of the catalyst. The application thereof likewise ends after a defined distance in the support body which is less than the length L of the support body. FIG. 2 shows the schematic construction of such a zone catalyst, FIG. 2*a*) showing an overview of the coated flow honeycomb (1). FIGS. 2*b* to 2*d* show, in schematic view, an individual flow channel (2) as a section from the zone catalyst and the coating components (material zones) arranged therein on the gas-tight walls (4) which bound the flow channel. The length of the zones can be selected in the course of coating such that the material zones at a selected point are in contact with a partial length section of the support body ("zones end to end"; FIG. 2*b*). It is likewise possible to select the zone lengths such that there is an overlap in the intermediate region (FIG. 2*d*). The zone lengths are preferably selected such that a gap remains between the two material zones (FIG. 2*c*). The gap is preferably between 2 and 10 millimeters, more preferably between 3 and 6 millimeters, in length. This embodiment has advantages especially in the case of noble metal-containing variants of the inventive catalyst, since intimate contact between the noble metal present in one material zone and the selectively catalytically reductive (SCR-active) mixed oxide consisting of cerium oxide, zirconium oxide, rare earth sesquioxide and niobium oxide and optionally tungsten oxide present in the other material zone is completely prevented therein. This prevents thermally diffusive transfer of the noble metal to the mixed oxide, the result of which is a higher selectivity for nitrogen in the resulting catalyst.

In the preferred embodiments of the inventive layer catalyst, the second material zone, which comprises the compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof and/or noble metal, has been applied directly to the support body and covers it over the entire length L thereof. The first material zone comprising the catalytically active mixed oxide consisting of cerium oxide, zirconium oxide, rare earth sesquioxide and niobium oxide and optionally tungsten oxide has been applied to the second material zone and covers it completely over the entire length L. The result of this arrangement of the material zones is that nitrogen oxides which are desorbed from the second material zone can be reacted with ammonia to give nitrogen in the SCR-active material zone above it.

In the preferred embodiments of the inventive zone catalyst, in which the two material zones are arranged successively on the support body in flow direction of the exhaust gas, the second material zone covers 10 to 70% of the length L of the support body, calculated from the first end thereof, whereas the first material zone covers 30 to 90% of the length L of the support body, calculated from the second end thereof.

The inventive zone catalysts are generally used in such a way that the first end is on the inflow side and the second end on the outflow side. This arrangement likewise has the advantage that nitrogen oxides which are desorbed from the second material zone which stores nitrogen oxides can be reacted with ammonia to give nitrogen in the first material zone arranged downstream on the outflow side. In addition, the arrangement of the second material zone on the inflow side ensures a maximum possible temperature level in the catalyst, which leads overall to optimal NOx storage rates, i.e. improved compared to the inverse arrangement, in the second material zone.

However, the reverse arrangement of the zones is also possible, such that the first material zone comprising the selectively catalytically reductive (SCR-active) mixed oxide composed of cerium oxide, zirconium oxide, rare earth sesquioxide and niobium oxide and optionally tungsten oxide is disposed at the first end, i.e. on the inflow side, while the second material zone is disposed at the second end, i.e. on the outflow side. In these cases, an additional SCR catalyst is preferably arranged downstream of the inventive catalyst in the exhaust gas cleaning system. This gives rise to a device which, as well as an inventive catalyst, comprises an SCR catalyst arranged on the outflow side with respect to the inventive catalyst. Particular preference is given to supplementing such a device with an additional dosage device for reducing agent arranged between the inventive catalyst and the outflow side of the SCR catalyst. In this configuration, both nitrogen oxides which are desorbed at relatively high exhaust gas temperatures from the second material zone of the upstream inventive catalyst and any nitrogen oxides which form at relatively high temperatures through overoxidation of ammonia over the second material zone can be converted effectively to nitrogen over the downstream SCR catalyst.

The inventive catalyst is suitable for removal of nitrogen oxides from the exhaust gas of diesel engines. Although the catalyst has the ability to store nitrogen oxides, it is not operated cyclically in alternately rich and lean exhaust gas. The exhaust gas to be cleaned has an air ratio $\lambda$ greater than 1, and is passed over the inventive catalyst for denoxing. Preference is given to adding ammonia or a compound decomposable to ammonia as a reducing agent from a source independent of the engine to the exhaust gas to be cleaned prior to entry into the catalyst. Particular preference is given to the use of urea as the compound decomposable to ammonia, in which case this is not supplied to the exhaust gas to be cleaned until the temperatures are higher than or equal to 180° C. At temperatures lower than or equal to 200° C., the inventive catalyst over which the exhaust gas to be cleaned is passed stores nitrogen oxides in the form of nitrates. At temperatures higher than 200° C., these nitrogen oxides are released again. Still over the inventive catalyst, the selective catalytic reduction thereof with ammonia proceeds to give nitrogen.

According to the application, it may be advantageous to additionally pass the exhaust gas to be cleaned over a catalyst which predominantly accelerates the selective catalytic reduction of nitrogen oxides with ammonia. The supplementary aftertreatment over an SCR catalyst is advisable, for example, when there is a risk that nitrogen oxides at specific operating points will break through the inventive catalyst or be released from the nitrogen oxide store present in the inventive catalyst without sufficient reduction of the nitrogen oxides to nitrogen still being possible over the inventive catalyst. For instance, a need for a corresponding system configuration could arise if the selectively catalytically reductive (SCR-active) mixed oxide consisting of cerium oxide, zirconium oxide, rare earth sesquioxide and niobium oxide and possibly tungsten oxide is present in a zone of comparatively short dimensions. In such cases, it is necessary to integrate the inventive catalyst into an exhaust gas system which, as well as other exhaust gas cleaning units, for example diesel oxidation catalyst and/or diesel particulate filter, may also comprise other denoxing catalysts, preferably SCR catalysts.

The invention is illustrated in detail hereinafter by some figures and a working example. The figures show:

Material zone (3a) comprises a catalytically active mixed oxide consisting of cerium oxide, zirconium oxide, rare earth sesquioxide and niobium oxide and possibly tungsten oxide.

Material zone (3b) comprises at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof.

Material zone (3a) comprises a catalytically active mixed oxide consisting of cerium oxide, zirconium oxide, rare earth sesquioxide and niobium oxide and possibly tungsten oxide.

Material zone (3b) comprises at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof.

FIG. 2b): "zones end to end";
FIG. 2c): zone coating with clear gap;
FIG. 2d): coating with overlapping zones.

In the examples which follow, unless stated otherwise, % in each case means % by weight.

The flow honeycombs used are, unless stated otherwise, made from cordierite and have a diameter of 38.1 mm, a length of 76.2 mm, a cell density of 62 cells/cm$^2$ and a wall thickness of 0.165 millimeter.

Example 1

96% by weight of a mixed oxide of the composition $Zr_{0.64}Ce_{0.2}Y_{0.075}Nb_{0.075}O_2$ (corresponding to the teaching of U.S. Pat. No. 6,468,941) was impregnated by the incipient wetness method with 4% by weight of barium oxide, dried and calcined in a customary manner.

The material thus obtained was used to make up a coating suspension, and this was used to coat a flow honeycomb with an amount of 320 g/L (248.64 g/L of the mixed oxide and 71.36 g/L of barium oxide). Drying and calcination result in an inventive catalyst.

Example 2

An inventive layer catalyst according to FIG. 1 was produced as follows:
a) For production of the second material zone (3b) for direct application to the flow honeycomb, a coating suspension of the following composition was made up:
20.5% of a lanthanum-doped mixed aluminum/cerium oxide
32.4% of a cerium oxide-doped mixed aluminum/magnesium oxide
30.6% cerium oxide
16.4% of a commercial mixed cerium/zirconium oxide with addition of 16.7% by weight of BaO In a customary manner, a flow honeycomb was coated with this suspension, dried and calcined. The amount applied was 220 g/L.
b) For production of the first material zone (3a), a mixed oxide of the composition $Zr_{0.64}Ce_{0.21}Y_{0.075}Nb0.075O_2$ (corresponding to the teaching of U.S. Pat. No. 6,468,941) was used to produce a coating suspension, and this was used to coat the singly coated flow honeycomb obtained according to a) once more. The amount applied was 100 g/L. Drying and calcination in a known manner resulted in an inventive layer catalyst.

Example 3

A flow honeycomb was coated in a known manner with 320 g/L of a mixture of the composition described in example 2a) (68.75%) with a mixed oxide of the composition $Zr_{0.64}Ce_{0.2}Y_{0.075}Nb_{0.075}O_2$ (corresponding to the teaching of U.S. Pat. No. 6,468,941) (31.25%). Drying and calcination in a known manner resulted in an inventive catalyst.

Example 4

An inventive layer catalyst according to FIG. 1 was produced as follows:
a) For production of the second material zone (3b) for direct application to the flow honeycomb, a coating suspension of the following composition was made up:
20.5% of a lanthanum-doped mixed aluminum/cerium oxide
32.4% of a cerium oxide-doped mixed aluminum/magnesium oxide
30.1% cerium oxide
16.4% of a commercial mixed cerium/zirconium oxide with addition of 16.7% by weight of BaO
0.5% platinum In a customary manner, a flow honeycomb was coated with this suspension, dried and calcined. The amount applied was 220 g/L.
b) For production of the first material zone (3a), a mixed oxide of the composition $Zr_{0.64}Ce_{0.21}Y_{0.075}Nb_{0.075}O_2$ (corresponding to the teaching of U.S. Pat. No. 6,468,941) was used to produce a coating suspension, and this was used to coat the singly coated flow honeycomb obtained according to a) once more. The amount applied was 100 g/L. Drying and calcination in a known manner resulted in an inventive layer catalyst.

Example 5

An inventive zone catalyst according to FIG. 2b) was produced as follows:
a) To produce the front, inflow-side material zone (3b), a flow honeycomb having a length of 76.2 mm was coated for a length of 50.8 mm from a first end with the coating suspension described in example 4a). The amount applied was 320 g/L. This was followed by drying and calcination.
b) To produce the back, outflow-side material zone (3a), the flow honeycomb obtained according to a), beginning from the second end, was coated for a length of 25.4 mm with a coating suspension which contained a mixed oxide of the composition $Zr_{0.49}Ce_{0.31}Y_{0.043}Nb_{0.15}O_2$. The amount applied was 200 g/L. This was followed by drying and calcination.

The catalyst obtained is referred to hereinafter as C5.

Example 6

An inventive zone catalyst, which was used with material zone (3a) arranged on the inflow side and material zone (3b) on the outflow side, was produced as follows:
a) To produce the back, outflow-side material zone, a flow honeycomb having a length of 76.2 mm was coated for a length of 50.8 mm from a first end with a coating suspension containing the following constituents:
16.8% of a lanthanum-doped mixed aluminum/cerium oxide
29.1% of a cerium oxide-doped mixed aluminum/magnesium oxide
23.2% of a mixed cerium/zirconium/praseodymium oxide
22.0% of a commercial mixed cerium/zirconium/lanthanum oxide with addition of 9.2% by weight of BaO
8.2% of a mixed cerium/zirconium/praseodymium oxide with addition of 13.6% by weight of SrO
0.2% platinum
0.5% palladium The amount applied was 320 g/L. This was followed by drying and calcination.

b) To produce the front, inflow-side material zone, the flow honeycomb obtained according to a), beginning from the second end, was coated for a length of 25.4 mm with the coating suspension described in example 5b). The amount applied was 200 g/L. This was followed by drying and calcination.

c) In the inventive use, a separate SCR catalyst is connected downstream of the flow honeycomb thus obtained. This SCR catalyst was obtained by coating a flow honeycomb of length 76.22 mm with the coating suspension described in example 5b). The amount applied was 200 g/L. This was followed by drying and calcination.

Example 7

An inventive layer catalyst according to FIG. 1 was produced as follows:

The singly coated flow honeycomb produced according to example 2a), to produce the first material zone (3a), was coated once more with a coating suspension containing a mixed oxide of the composition $Zr_{0.59}Ce_{0.21}Y_{0.1}Nb_{0.1}O_2$ (corresponding to the teaching of U.S. Pat. No. 6,468,941). The amount applied was 100 g/L. Drying and calcination in a known manner resulted in an inventive layer catalyst, which is referred to hereinafter as C7.

Example 8

An inventive layer catalyst according to FIG. 1 was produced as follows:

The singly coated flow honeycomb produced according to example 4a), to produce the first material zone (3a), was coated once more with a coating suspension containing a mixed oxide of the composition $Zr_{0.59}Ce_{0.21}Y_{0.1}Nb_{0.1}O_2$ (corresponding to the teaching of U.S. Pat. No. 6,468,941). The amount applied was 100 g/L. Drying and calcination in a known manner resulted in an inventive layer catalyst, which is referred to hereinafter as C8.

Example 9

An inventive layer catalyst according to FIG. 1 was produced as follows:

a) For production of the second material zone (3b) for direct application to the flow honeycomb, a coating suspension of the following composition was made up:
19.1% of a lanthanum-doped mixed aluminum/cerium oxide
31.4% of a cerium oxide-doped mixed aluminum/magnesium oxide
23.6% cerium oxide
16.7% of a commercial mixed cerium/zirconium/lanthanum oxide with addition of 15.7% by weight of BaO
7.6% of a mixed cerium/zirconium/praseodymium oxide with addition of 5% by weight of $K_2O$
0.2% platinum
1.4% gold In a customary manner, a flow honeycomb was coated with this suspension, dried and calcined. The amount applied was 220 g/L.

b) For production of the first material zone (3a), a mixed oxide of the composition $Zr_{0.5}Ce_{0.2}Y_{0.06}Nb_{0.06}W_{0.17}O_2$ was used to produce a coating suspension, and this was used to coat the singly coated flow honeycomb obtained according to a) once more. The amount applied was 100 g/L. Drying and calcination in a known manner resulted in an inventive layer catalyst.

Example 10

77.7% by weight of a mixed oxide of the composition $Zr_{0.59}Ce_{0.21}Y_{0.1}Nb_{0.1}O_2$ (corresponding to the teaching of U.S. Pat. No. 6,468,941) was impregnated by the incipient wetness method with 22.3% by weight of barium oxide, dried and calcined in a customary manner.

The material thus obtained was used to make up a coating suspension, and this was used to coat a flow honeycomb with an amount of 320 g/L (248.64 g/L of the mixed oxide and 71.36 g/L of barium oxide). Drying and calcination resulted in an inventive catalyst, which is referred to hereinafter as C10.

Example 11

A flow honeycomb was coated in a known manner with 400 g/L of a mixture of 20% by weight of cerium oxide, 10% by weight of a lanthanum-doped mixed aluminum/cerium oxide and 20% by weight of a lanthanum-doped mixed cerium/zirconium/praseodymium oxide and 50% by weight of a mixed oxide of the composition $Zr_{0.5}Ce_{0.2}Y_{0.06}Nb_{0.06}W_{0.15}O_2$ (corresponding to the teaching of U.S. Pat. No. 6,468,941) (200 g/L). Drying and calcination in a known manner resulted in an inventive catalyst, which is referred to hereinafter as C11.

Example 12

An inventive zone catalyst, which was used with material zone (3a) arranged on the inflow side and material zone (3b) on the outflow side, was produced as follows:

a) To produce the back, outflow-side material zone, a flow honeycomb having a length of 76.2 mm was coated for a length of 50.8 mm from a first end with a coating suspension containing the following constituents:
20.5% of a lanthanum-doped mixed aluminum/cerium oxide
32.5% of a cerium oxide-doped mixed aluminum/magnesium oxide
30.1% cerium oxide
16.4% of a commercial mixed cerium/zirconium oxide with addition of 16.7% by weight of BaO
0.5% platinum The amount applied was 320 g/L. This was followed by drying and calcination.

b) To produce the front, inflow-side material zone, the flow honeycomb obtained according to a), beginning from the second end, was coated for a length of 25.4 mm with the coating suspension described in example 5b). The amount applied was 200 g/L. This was followed by drying and calcination.

The inventive catalyst thus obtained is referred to hereinafter as C12.

Example 13

91% by weight of a mixed oxide of the composition $Zr_{0.64}Ce_{0.2}Y_{0.075}Nb_{0.075}O_2$ (corresponding to the teaching of U.S. Pat. No. 6,468,941) was impregnated by the incipient wetness method with 9% by weight of barium oxide, dried and calcined in a customary manner.

The material thus obtained was used to make up a coating suspension, and this was used to coat a flow honeycomb with an amount of 320 g/L (248.64 g/L of the mixed oxide and 71.36 g/L of barium oxide). Drying and calcination resulted in an inventive catalyst.

Example 14

An inventive catalyst was produced in the form of a layer catalyst according to FIG. 1.

To produce the second material zone (3b) for direct application to the flow honeycomb, a coating suspension having the following composition was made up (the amounts stated are based on the volume L of the resulting catalyst):

| | |
|---|---|
| 45 g/L | of a lanthanum-doped mixed aluminum/cerium oxide; |
| 71 g/L | of a cerium oxide-doped mixed aluminum/magnesium oxide; |
| 1.06 g/L | of palladium as a palladium nitrate solution; |
| 36 g/L | of mixed cerium/zirconium oxide with addition of 16.67% by weight of BaO; |
| 66 g/L | of cerium oxide. |

All raw materials used are commercially available. Only the mixed cerium/zirconium oxide with added barium oxide is a self-produced powder component. It was produced by slurrying a commercially available mixed cerium/zirconium oxide in an aqueous barium acetate solution. The suspension thus obtained was dried at 120° C. over a period of 10 h and then calcined at 500° C. for 2 hours. The powder thus obtained was ground and used to produce the coating suspension.

The coating suspension thus obtained was used to coat a flow honeycomb having 62 cells per square centimeter, a cell wall thickness of 0.165 millimeter and a length of 76.2 mm in a customary dip-coating process known to those skilled in the art. The component was dried and calcined at 500° C. for a period of 2 hours.

For the production of the first material zone (3a), a commercially available mixed cerium/zirconium oxide having a weight ratio of $CeO_2:ZrO_2$ of 1:1.1 and an $Nd_2O_3$ content of 5.3% by weight was impregnated with an aqueous solution of ammonium niobium oxalate and calcined at 500° C. for a period of 2 hours. The inventive mixed oxide composition obtained in this way consisted of 38% by weight of $CeO_2$, 14.5% by weight of $Nb_2O_5$, 4.5% by weight of $Nd_2O_3$ and 43% by weight of $ZrO_2$. The mixed oxide was used to make up a coating suspension, which was used to coat the flow honeycomb, which had already been coated once as described above, once more. The component thus obtained was dried and then calcined at 500° C. for a period of 2 hours.

Within the NEDC-relevant temperature range, and here particularly within the low-temperature range to 230° C., particularly to 200° C., the inventive catalyst exhibits considerably improved nitrogen oxide conversions compared to catalysts according to the prior art, and thus has reduced $NO_x$ emissions in the NEDC compared to conventional emissions.

Comparative Examples 1 to 3

A flow honeycomb having a length of 76.2 mm was coated in a known manner with a coating suspension which contained a mixed oxide of the composition $Zr_{0.59}Ce_{0.21}Y_{0.1}Nb_{0.1}O_2$ (corresponding to the teaching of U.S. Pat. No. 6,468,941). The amounts applied were:
Comparative example 1: 250 g/L
Comparative example 2: 320 g/L
Comparative example 3: 100 g/L The coating was followed by drying and calcination in a known manner. The catalysts obtained are referred to hereinafter as CC1, CC2 and CC3 respectively.

Comparative Example 4

A flow honeycomb having a length of 76.2 mm was coated in a known manner with a coating suspension which contained a mixed oxide of the composition $Zr_{0.49}Ce_{0.31}Y_{0.043}Nb_{0.15}O_2$. The amount applied was 200 g/L. The coating was followed by drying and calcination in a known manner. The catalyst obtained is referred to hereinafter as CC4.

Comparative Example 5

A flow honeycomb having a length of 76.2 mm was coated in a known manner with a coating suspension which contained a mixed oxide of the composition $Zr_{0.5}Ce_{0.2}Y_{0.06}Nb_{0.06}W_{0.17}O_2$. The amount applied was 200 g/L. The coating was followed by drying and calcination in a known manner. The catalyst obtained is referred to hereinafter as CC5.

Comparative Tests

The $NO_x$ conversion of the inventive catalysts C7, C8 and C10 was compared with catalysts CC1, CC2 and CC3 in a test gas system. In an analogous manner, the $NO_x$ conversion of inventive catalysts C5 and C12 was compared with CC4, and the $NO_x$ conversion of inventive catalyst C11 with CC5. The inventive catalysts, and comparative catalysts compared with each, each contain the identical mixed oxide consisting of cerium oxide, zirconium oxide, rare earth sesquioxide, niobium oxide and optionally tungsten oxide.

For the comparisons, the test method described below was used:

Before the start of the test phase, conditioning takes place at 550° C., such that the catalyst sample at the start of the test phase is free of adhering $NO_x$ and $NH_3$. Conditioning is followed by cooling to the test temperature of 150° C. under protective gas ($N_2$). The test temperature is kept constant at 150° C. for 5 minutes. During the test phase, the following gas composition is metered in:
$O_2$/% by vol.: 8
NO/ppmV: 250
$NO_2$/ppmV: 250
$H_2O$/% by vol.: 10
residual gas $N_2$ The space velocity over the entire test was: GHSV=30 000 $h^{-1}$ The known nitrogen oxide contents metered in, which were verified during the conditioning at the start of each test run with pre-catalyst offgas analysis, and the nitrogen oxide contents measured after catalyst were used to calculate the nitrogen oxide conversion over the catalyst as follows:

$$U_{NO_x}[\%] = \left[\left(1 - \frac{c_{outlet}(NO_x)}{c_{inlet}(NO_x)}\right) \cdot 100\right]$$

where $c_{inlet/outlet}(NO_x) = c_{in/out}(NO) + c_{in/out}(NO_2)$ ...

In order to show the advantages of the inventive catalysts compared to the comparative catalysts in the region of relatively low temperatures, the mean nitrogen oxide conversion in the test phase was determined over the entire duration of 5 minutes.

The following results were obtained:

| Catalyst | $NO_x$ conversion (X(NOx) [%]) |
|---|---|
| C5 | 52.3 |
| C12 | 63.1 |

-continued

| Catalyst | NO$_x$ conversion (X(NOx) [%]) |
|---|---|
| CC4 | 10.1 |
| C7 | 49.6 |
| C8 | 59.4 |
| C10 | 84.8 |
| CC1 | 13.2 |
| CC2 | 13.9 |
| CC3 | 8.1 |
| C11 | 30.6 |
| CC5 | 10.8 |

It thus becomes clear that the inventive catalysts, compared to the comparative catalysts, in the test phase which reflects the region of relatively low temperatures prior to the NH$_3$ addition, feature much better NOx conversions.

The invention claimed is:

1. A catalyst for removing nitrogen oxides from the exhaust gas of diesel engines, consisting of a support body of length L and a catalytically active coating composed of one or more material zones comprising:
   a) a catalytically active mixed oxide consisting of cerium oxide, zirconium oxide, rare earth sesquioxide and niobium oxide; and
   b) at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof, and
   wherein the catalytically active mixed oxide, based on the total amount thereof, has the following composition:
   CeO$_2$: 15-50% by wt.
   Nb$_2$O$_5$: 3-25% by wt.
   RE$_2$O$_3$: 3-10% by wt.
   ZrO$_2$: remainder.

2. The catalyst as claimed in claim 1, wherein the catalytically active coating further comprises a cerium oxide and/or mixed cerium zirconium oxide which functions as a support oxide for the compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof.

3. The catalyst as claimed in claim 1, wherein the catalytically active coating comprises one or more noble metals selected from the group consisting of platinum, palladium, rhodium, iridium, ruthenium, gold, silver and mixtures and/or alloys thereof.

4. The catalyst as claimed in claim 1, wherein the catalytically active coating consists of two material zones, the first material zone comprising the catalytically active mixed oxide consisting of cerium oxide, zirconium oxide, rare earth sesquioxide and niobium oxide, while the compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof is present in the second material zone.

5. The catalyst as claimed in claim 3, wherein the catalytically active coating consists of two material zones, the first material zone comprising the catalytically active mixed oxide consisting of cerium oxide, zirconium oxide, rare earth sesquioxide and niobium oxide, while the noble metal selected from the group consisting of platinum, palladium, rhodium, iridium, ruthenium, gold, silver and mixtures and/or alloys thereof is present in the second material zone.

6. The catalyst as claimed in claim 4, wherein the second material zone has been applied directly to the support body and covers it over the entire length L thereof, while the first material zone has been applied to the second material zone and covers it completely over the entire length L.

7. The catalyst as claimed in claim 4, wherein the two material zones are arranged successively on the support body in flow direction of the exhaust gas, the second material zone covering 10 to 70% of the length L of the support body, calculated from the first end of the support body, whereas the first material zone covers 30 to 90% of the length L of the support body, calculated from the second end of the support body.

8. The catalyst as claimed in claim 4, wherein the two material zones are arranged successively on the support body in flow direction of the exhaust gas, the first material zone covering 10 to 70% of the length L of the support body, calculated from the first end of the support body, whereas the second material zone covers 30 to 90% of the length L of the support body, calculated from the second end of the support body.

9. A process for removing nitrogen oxides from the exhaust gas of diesel engines, wherein the exhaust gas to be cleaned has an air ratio λ greater than 1 and is passed over a catalyst as claimed in claim 1.

10. The process as claimed in claim 9, wherein ammonia or a compound decomposable to ammonia is supplied as a reducing agent to the exhaust gas to be cleaned from a source independent of the engine prior to entry into the catalyst.

11. The process as claimed in claim 10, wherein the catalyst over which the exhaust gas to be cleaned is passed stores nitrogen oxides in the form of nitrates at temperatures less than or equal to 200° C., releases them again at temperatures higher than 200° C., and at the same time catalyzes the selective catalytic reduction thereof with ammonia.

12. The process as claimed in claim 9, wherein the exhaust gas to be cleaned is additionally passed over a catalyst which predominantly accelerates the selective catalytic reduction of nitrogen oxides with ammonia.

13. A device for performing the process as claimed in claim 12, comprising:
   a first catalyst comprising;
   a) a catalytically active mixed oxide consisting of cerium oxide, zirconium oxide, rare. earth sesquioxide and niobium oxide and optionally tungsten oxide; and
   b) at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof, and
   an SCR catalyst arranged on the outflow side with respect to said first catalyst.

14. A catalyst for removing nitrogen oxides from the exhaust gas of diesel engines, consisting of a support body of length L and a catalytically active coating composed of one or more material zones comprising:
   a) a catalytically active mixed oxide consisting of cerium oxide, zirconium oxide, rare earth sesquioxide, niobium oxide, and tungsten oxide; and
   b) at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof and wherein the catalytically active mixed oxide, based on the total amount thereof, has the following composition:

$CeO_2$: 15-50% by wt.
$Nb_2O_5$: 3-25% by wt.
$RE_2O_3$: 3-10% by wt.
$WO_3$: 3-20% by wt.
$ZrO_2$: remainder.

15. A process for removing nitrogen oxides from the exhaust gas of diesel engines, wherein the exhaust gas to be cleaned has an air ratio λ greater than 1 and is passed over a catalyst for removing nitrogen oxides from the exhaust gas of diesel engines, consisting of a support body of length L and a catalytically active coating composed of one or more material zones comprising:

a) a catalytically active mixed oxide consisting of cerium oxide, zirconium oxide, rare earth sesquioxide and niobium oxide and optionally tungsten oxide; and b) at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof, and wherein ammonia or a compound decomposable to ammonia is supplied as a reducing agent to the exhaust gas to be cleaned from a source independent of the engine prior to entry into the catalyst.

16. A catalyst for removing nitrogen oxides from the exhaust gas of diesel engines, consisting of a support body of length L and a catalytically active coating composed of one or more material zones comprising:

a) a catalytically active mixed oxide consisting of cerium oxide, zirconium oxide, rare earth sesquioxide and niobium oxide and optionally tungsten oxide; and b) at least one compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof, wherein the catalytically active coating consists of two material zones, the first material zone comprising the catalytically active mixed oxide consisting of cerium oxide, zirconium oxide, rare earth sesquioxide and niobium oxide and optionally tungsten oxide, while the compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof is present in the second material zone, and wherein the material zones are arranged as one of the following (a), (b), or (c):

(a) the second material zone has been applied directly to the support body and covers it over the entire length L thereof, while the first material zone has been applied to the second material zone and covers it completely over the entire length L, (b) the two material zones are arranged successively on the support body in flow direction of the exhaust gas, the second material zone covering 10 to 70% of the length L of the support body, calculated from the first end of the support body, whereas the first material zone covers 30 to 90% of the length L of the support body, calculated from the second end of the support body, or (c) the two material zones are arranged successively on the support body in flow direction of the exhaust gas, the first material zone covering 10 to 70% of the length L of the support body, calculated from the first end of the support body, whereas the second material zone covers 30 to 90% of the length L of the support body, calculated from the second end of the support body.

17. The catalyst of claim 14, wherein the catalytically active coating consists of two material zones, the first material zone comprising the catalytically active mixed oxide consisting of cerium oxide, zirconium oxide, rare earth sesquioxide, niobium oxide, and tungsten oxide, while the compound selected from the group consisting of barium oxide, barium hydroxide, barium carbonate, strontium oxide, strontium hydroxide, strontium carbonate, praseodymium oxide, lanthanum oxide, magnesium oxide, mixed magnesium/aluminum oxide, alkali metal oxide, alkali metal hydroxide, alkali metal carbonate and mixtures thereof is present in the second material zone.

18. The catalyst of claim 14, wherein the catalytically active coating comprises one or more noble metals selected from the group consisting of platinum, palladium, rhodium, iridium, ruthenium, gold, silver and mixtures and/or alloys thereof.

19. The catalyst of claim 18, wherein the catalytically active coating consists of two material zones, the first material zone comprising the catalytically active mixed oxide consisting of cerium oxide, zirconium oxide, rare earth sesquioxide, niobium oxide, and tungsten oxide, while the noble metal selected from the group consisting of platinum, palladium, rhodium, iridium, ruthenium, gold, silver and mixtures and/or alloys thereof is present in the second material zone.

* * * * *